United States Patent
Sato et al.

(10) Patent No.: US 8,105,731 B2
(45) Date of Patent: Jan. 31, 2012

(54) FUEL CELL SYSTEM

(75) Inventors: Masahiko Sato, Utsunomiya (JP); Tadashi Nishiyama, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/622,128

(22) Filed: Nov. 19, 2009

(65) Prior Publication Data
US 2010/0068600 A1   Mar. 18, 2010

Related U.S. Application Data

(62) Division of application No. 10/957,230, filed on Oct. 1, 2004, now Pat. No. 7,648,793.

(30) Foreign Application Priority Data

Oct. 3, 2003  (JP) ................................. 2003-345968

(51) Int. Cl.
  *H01M 8/04* (2006.01)
  *H01M 2/08* (2006.01)
(52) U.S. Cl. ................ 429/513; 429/512; 429/507
(58) Field of Classification Search .......... 429/512, 429/513, 507
  See application file for complete search history.

(56) References Cited

U.S. PATENT DOCUMENTS

| | | | |
|---|---|---|---|
| 5,486,430 A | 1/1996 | Gorbell et al. | |
| 6,455,179 B1 * | 9/2002 | Sugita et al. | 429/471 |
| 6,613,470 B1 | 9/2003 | Sugita et al. | |
| 2004/0091761 A1 | 5/2004 | Enjoji et al. | |
| 2004/0253499 A1 * | 12/2004 | Sato et al. | 429/32 |

FOREIGN PATENT DOCUMENTS

| | | |
|---|---|---|
| DE | 10041532 A1 | 3/2001 |
| DE | 10239496 A1 | 9/2003 |
| EP | 1263075 A2 | 12/2002 |
| JP | 08-171926 | 7/1996 |
| JP | 2001-076751 | 3/2001 |
| JP | 2003068349 | 3/2003 |
| JP | 2003-345968 | 12/2003 |
| WO | WO 96/20509 | 7/1996 |

OTHER PUBLICATIONS

Office Action dated Sep. 15, 2009 issued over corresponding Japanese Patent Application No. 2003-345968.
Notice of Allowance dated Sep. 21, 2009 for U.S. Appl. No. 10/957,230.
Office Action dated Oct. 24, 2007 for U.S. Appl. No. 10/957,230.
Office Action dated May 14, 2008 for U.S. Appl. No. 10/957,230.
Office Action dated Sep. 17, 2008 for U.S. Appl. No. 10/957,230.
Office Action dated Apr. 9, 2009 for U.S. Appl. No. 10/957,230.

* cited by examiner

*Primary Examiner* — Karie O'Neill Apicella
(74) *Attorney, Agent, or Firm* — Fish & Richardson P.C.

(57) ABSTRACT

A fuel cell system includes first and second fuel cell stacks which are juxtaposed to each other. An assembly manifold is attached to the first and second fuel cell stacks. A connection block is provided at a central position of the assembly manifold. A fuel gas supply port and a fuel gas discharge port are provided on a front surface of the connection block, and an oxygen-containing gas supply port and an oxygen-containing gas discharge port are provided on a back surface of the connection block. A fuel gas and an oxygen-containing gas are equally supplied to each of the first and second fuel cell stacks.

3 Claims, 9 Drawing Sheets

FUEL CELL SYSTEM

CROSS-REFERENCE TO RELATED APPLICATIONS

This application is a divisional application of and claims priority to U.S. application Ser. No. 10/957,230, filed on Oct. 1, 2004 now U.S. Pat. No. 7,648,793, which is the U.S. National Phase counterpart to Japanese Application No. 2003-0345968, filed on Oct. 3, 2003.

BACKGROUND OF THE INVENTION

1. Field of the Invention

The present invention relates to a fuel cell system including a fuel cell stack formed by stacking a plurality of unit cells in a horizontal direction. Each of the unit cells includes an electrolyte electrode assembly and separators sandwiching the electrolyte electrode assembly. The electrolyte electrode assembly includes a pair of electrodes and an electrolyte interposed between the electrodes. Six fluid passages extend through the unit cells in the stacking direction. Three of the six fluid passages are provided on the left of the unit cells, and the other three of the six fluid passages are provided on the right of the unit cells.

2. Description of the Related Art

For example, a solid polymer fuel cell employs a membrane electrode assembly which includes an anode and a cathode, and an electrolyte membrane (electrolyte) interposed between the anode and the cathode. The electrolyte membrane is a polymer ion exchange membrane. Each of the anode and the cathode is made of electrode catalyst layer of noble metal formed on a base material chiefly containing carbon. The membrane electrode assembly and separators sandwiching the membrane electrode assembly make up a unit of a fuel cell for generating electricity.

In the fuel cell, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. A gas chiefly containing oxygen or air (hereinafter also referred to as the oxygen-containing gas) is supplied to the cathode. At the cathode, the hydrogen ions from the anode combine with the electrons and oxygen to produce water.

Figure 9:
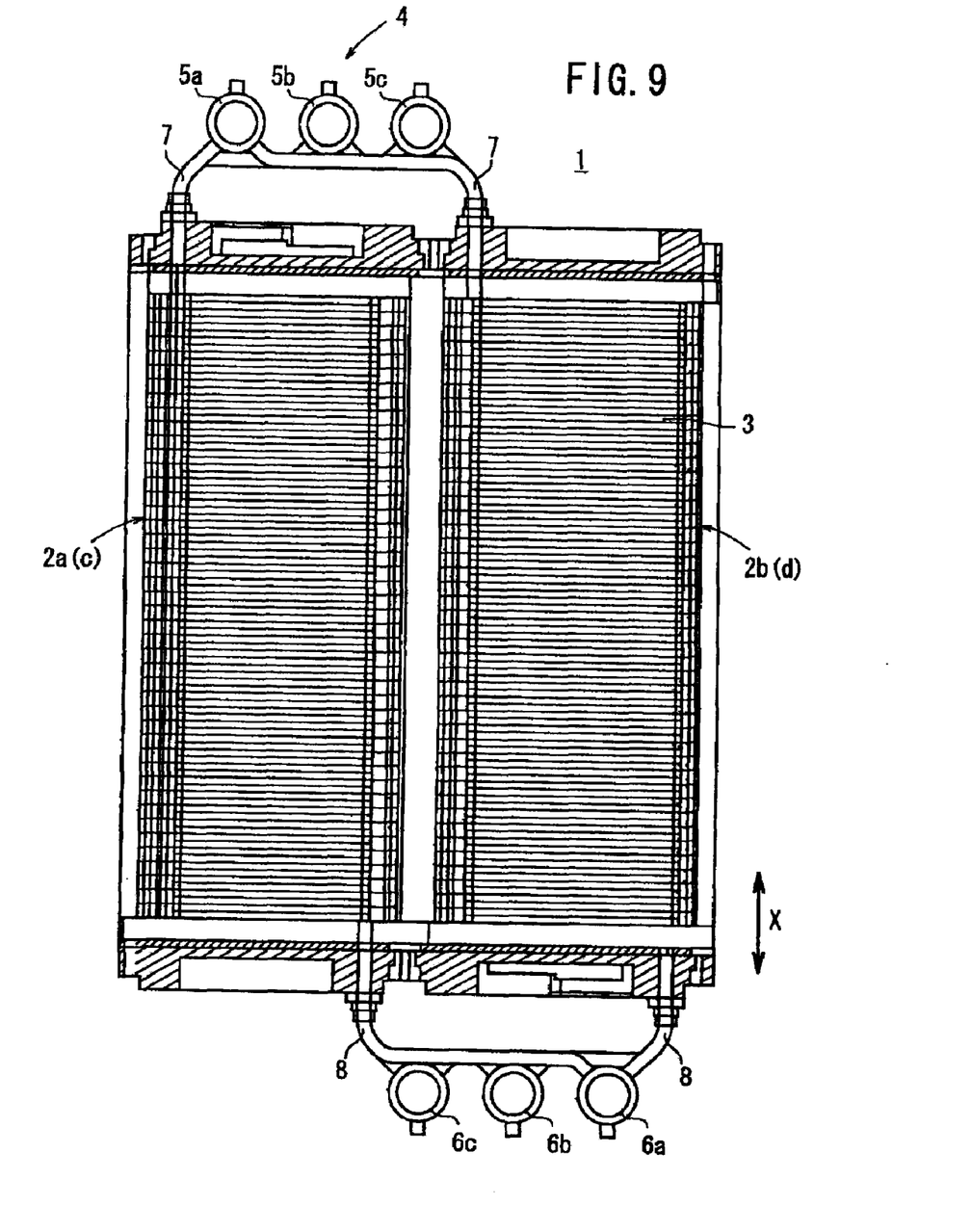
FIG. 9 is a view showing a conventional assembly.

Generally, a predetermined number of, e.g., several tens to several hundreds of fuel cells are stacked together to form a fuel cell stack for achieving the desired level of electricity in power generation. The fuel cell is considerably long in the stacking direction. Therefore, it is not possible to supply the fuel gas equally to each of the fuel cells. In order to address the problem, a fuel cell system including a plurality of juxtaposed fuel cell stacks has been proposed. For example, International Patent Publication No. 96/20509 titled "INTEGRATED EXTERNAL MANIFOLD ASSEMBLY FOR AN ELECTROCHEMICAL FUEL CELL STACK ARRAY" is known. In the conventional technique, as shown in FIG. 9, an electrochemical fuel cell stack array 1 includes four fuel cell stacks 2a through 2d. Each of the fuel cell stacks 2a through 2d is formed by stacking a plurality of unit cells 3 in a stacking direction indicated by an arrow X.

The electrochemical fuel cell stack array 1 is connected to external manifold assemblies 4. The external manifold assemblies 4 include a supply manifold comprising main pipes 5a, 5b, 5c, and a discharge manifold comprising main pipes 6a, 6b, 6c.

The fuel gas, the oxygen-containing gas, and the coolant flow through the main pipes 5a through 5c. For example, a plurality of manifold bifurcated pipes 7 for supplying the reactant gases to each of the fuel cell stacks 2a through 2d are connected to the manifold main pipe 5a.

Likewise, the fuel gas, the oxygen-containing gas, and the coolant flow through the main pipes 6a through 6c. For example, a plurality of manifold bifurcated pipes 8 for discharging the reactant gases from each of the fuel cell stacks 2a through 2d are connected to the manifold main pipe 6a.

However, in the conventional technique, since the external manifold assemblies 4 are provided on opposite ends of the electrochemical fuel cell stack array 1 in the direction indicated by the arrow X, the overall size of the electrochemical fuel cell stack array 1 is considerably large. The piping system is complicated and large. Thus, the operation of connecting the pipes is laborious, and the electrochemical fuel cell stack array 1 cannot be installed in a small space. In particular, the electrochemical fuel cell stack array 1 is not suitable for use in a vehicle.

Further, the manifold bifurcated pipes 7 branched from the main pipe 5a and the manifold bifurcated pipes 8 branched from the main pipe 6a have different lengths corresponding to the supply ports and discharge ports of the respective fuel cell stacks 2a through 2d. Therefore, it is not possible to provide the reactant gases to each of the fuel cell stacks 2a through 2c uniformly.

SUMMARY OF THE INVENTION

A main object of the present invention is to provide a fuel cell system which makes it possible to simplify and downsize the piping structure of a fuel cell stack effectively, reduce the number of components, and simplify the assembling operation.

According to an aspect of the present invention, a fuel cell system includes first and second fuel cell stacks having the same structure. Each of the first and second fuel cell stacks is formed by stacking a plurality of unit cells in a horizontal direction. Each of the unit cells includes an electrolyte electrode assembly and separators sandwiching the electrolyte electrode assembly. The electrolyte electrode assembly includes a pair of electrodes and an electrolyte interposed between the electrodes. Three of six fluid passages comprising a fuel gas supply passage, an oxygen-containing gas supply passage, a coolant supply passage, a fuel gas discharge passage, an oxygen-containing gas discharge passage, and a coolant discharge passage extend through a left end of each of the first and second fuel cell stacks, and the other three of the six fluid passages extend through a right end of each of the first and second fuel cell stacks. The first and second fuel cell stacks are juxtaposed along the stacking direction such that polarity of the first fuel cell stack and polarity of the second fuel cell stack are oriented oppositely. An assembly manifold is connected to first and second end plates provided adjacent to each other at one end of the first and second fuel cells.

The assembly manifold includes a plurality of pipes for supplying the fuel gas, the oxygen-containing gas, and the coolant to the first and second fuel cell stacks and discharging the fuel gas, the oxygen-containing gas, and the coolant from the first and second fuel cell stacks, and a connection block provided at a central position of the assembly manifold. The connection block has at least a supply port and a discharge port of the fuel gas, and a supply port and a discharge port of the oxygen-containing gas.

According to another aspect of the present invention, a fuel cell system includes a fuel cell stack formed by stacking a plurality of unit cells in a horizontal direction. Each of the unit cells includes an electrolyte electrode assembly and separators sandwiching the electrolyte electrode assembly, and the electrolyte electrode assembly includes a pair of electrodes and an electrolyte interposed between the electrodes. Three of six fluid passages comprising a fuel gas supply passage, an oxygen-containing gas supply passage, a coolant supply passage, a fuel gas discharge passage, an oxygen-containing gas discharge passage, and a coolant discharge passage extend through a left end of the fuel cell stack, and the other three of the six fluid passages extend through a right end of the fuel cell stack.

A single first manifold is connected to three fluid passages provided at one end of the first fuel cell stack. A single second manifold is connected to three fluid passages provided at the other end of the first fuel cell stack. The first and second manifolds are connected by a plurality of pipes.

According to the present invention, since the connection block is provided at a central position of the assembly manifold, the fuel gas and the oxygen-containing gas is equally distributed to each of the first and second fuel cell stacks provided on the left and right sides. Therefore, the desired power generation performance is reliably maintained in the first and second fuel cell stacks.

Further, the assembly manifold is attached to the end plate of the first fuel cell stack and the end plate of the second fuel cell stack which are adjacent to each other at one end of the first and second fuel cell stacks. Therefore, the overall size of the fuel cell system is small, and the piping structure and the piping operation are simplified.

The fuel gas supply port and the fuel gas discharge port are provided on the front surface of the connection block, and the oxygen-containing gas supply port and the oxygen-containing gas discharge port are provided on the back surface of the connection block. Therefore, sufficient space for providing the pipes and joints is available on both surfaces (the front surface and the back surface) of the connection block. A humidifier may be provided between the first and second fuel cell stacks to reduce the piping distance between the humidifier and the connection block effectively.

According to the present invention, since each of the manifolds is connected to three fluid passages, the number of components of the fuel cell system is considerably reduced, and the overall assembling operation of the assembly manifold is suitably simplified.

Further, a plurality of the pipes are provided in contact with the surface of the end plate. The reactant gas and the oxygen-containing gas discharged from the first fuel cell stack have high temperature, and the hot reactant gas and the hot coolant are used for heating the end plate. Therefore, with the simple structure, warming up process in the fuel cell stack is carried out rapidly.

Further, the adjacent pipes of the plurality of pipes are in contact with each other. The coolant and the oxygen-containing gas discharged from the first fuel cell stack are used for heating the coolant and the oxygen-containing gas supplied to the fuel cell stack. Therefore, the temperature in the fuel cell stack is uniform, and the power generation is carried out efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
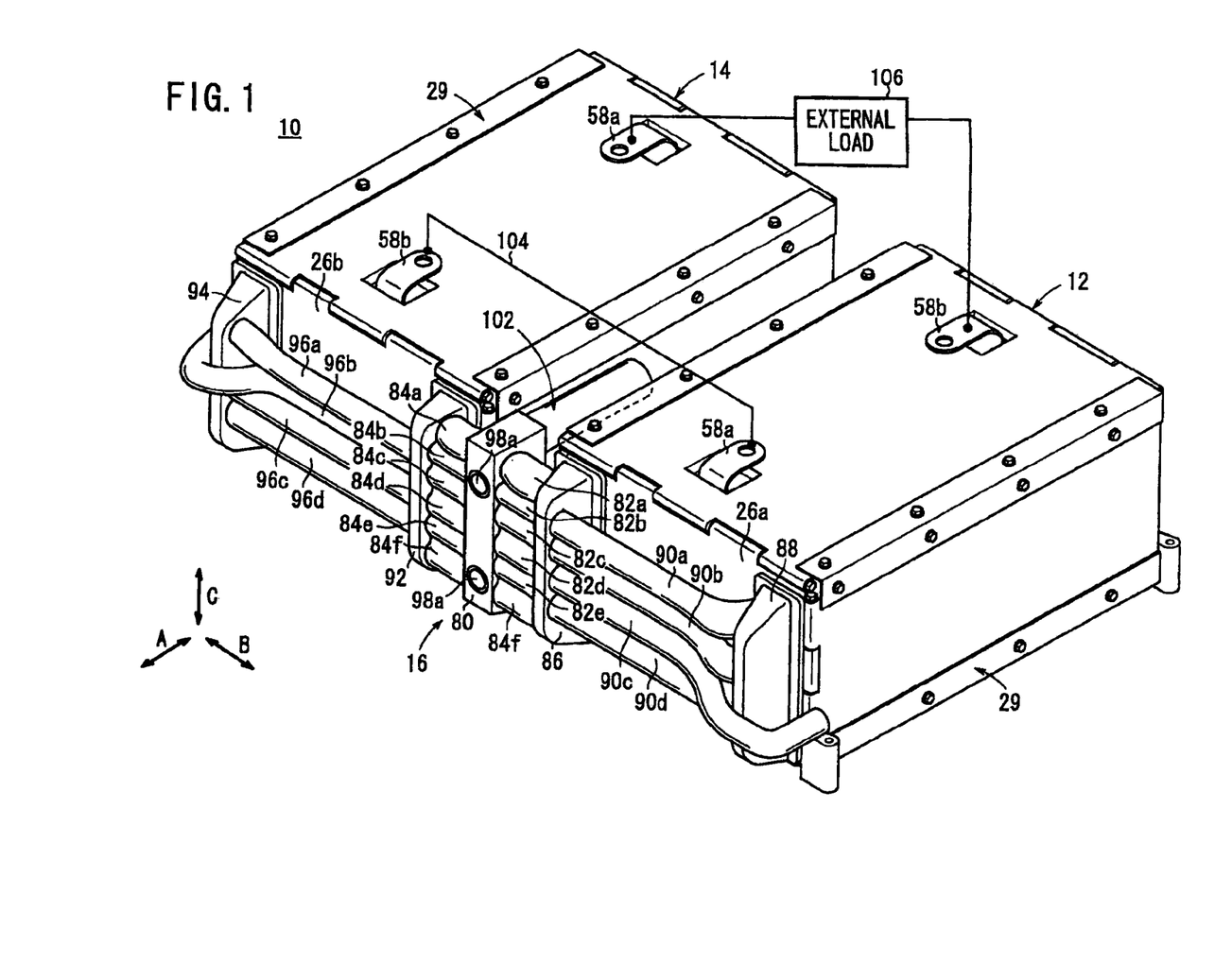
FIG. 1 is a perspective view schematically showing the overall structure of a fuel cell system according to an embodiment of the present invention.

FIG. 1 is a perspective view schematically showing the overall structure of a fuel cell system 10 according to an embodiment of the present invention.

The fuel cell system 10 includes a first fuel stack 12 and a second fuel cell stack 14 having the same structure. The first fuel cell stack 12 and the second fuel cell stack 14 are juxtaposed in a horizontal direction such that the polarity of the first fuel cell stack 12 and the polarity of the second fuel cell stack 14 are oriented oppositely. An assembly manifold 16 is attached to a horizontal end of the first and second fuel cell stacks 12, 14.

Figure 2:
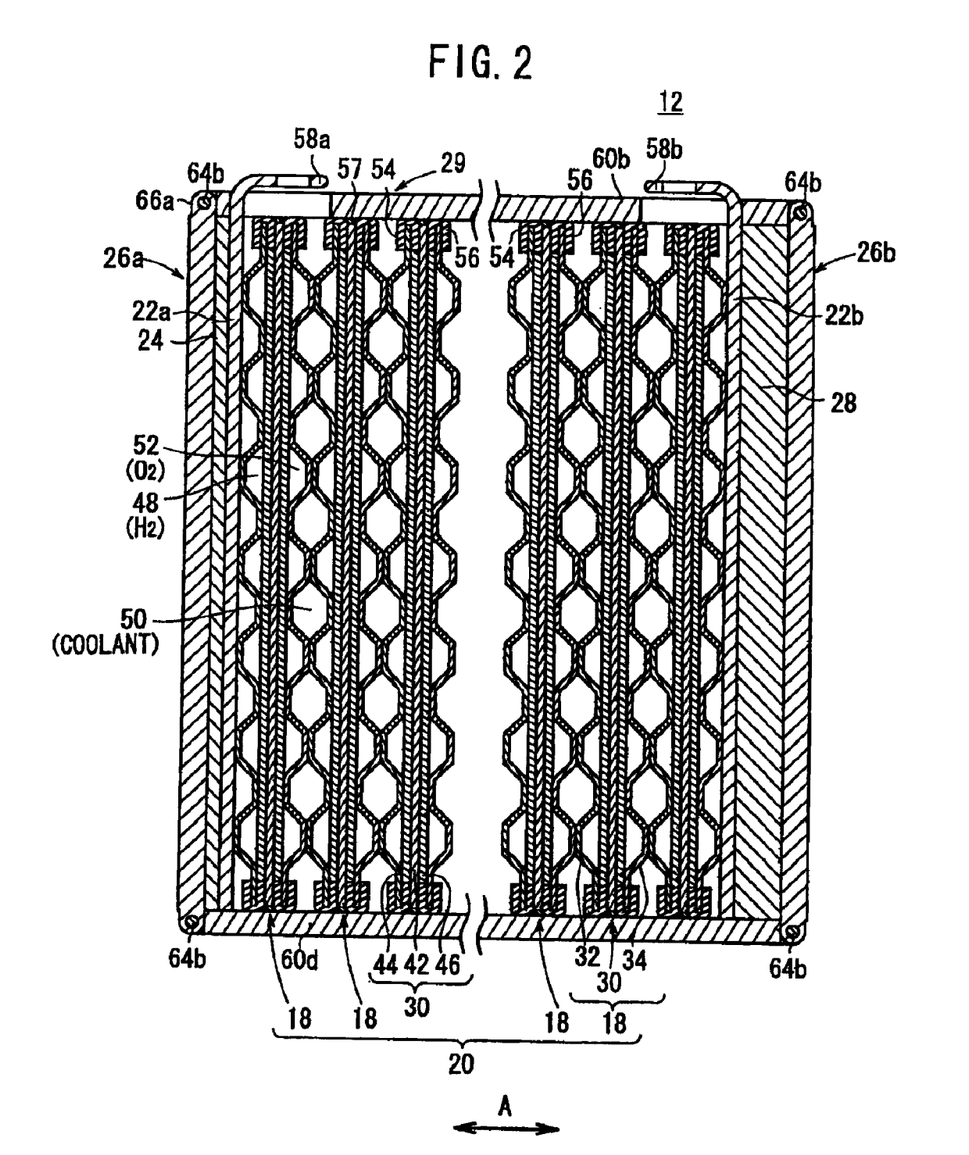
FIG. 2 is a cross sectional side view showing part of a fuel cell stack of the fuel cell system.

As shown in FIG. 2, the first fuel cell stack 12 includes a stack body 20 formed by stacking a plurality of unit cells 18 in a horizontal direction indicated by an arrow A. At an end of the stack body 20 in the stacking direction indicated by the arrow A, a terminal plates 22a is provided. An insulating plate 24 is provided outside the terminal plate 22a. Further, a first end plate 26a is provided outside the insulating plate 24. At the other end of the stack body 20 in the stacking direction, a terminal plate 22b is provided. An insulating spacer member 28 is provided outside the terminal plate 22b. Further, a second end plate 26b is provided outside the insulating spacer member 28. Each of the first and second end plates 26a, 26b has a rectangular shape. The first fuel cell stack 12 is assembled together such that the stack body 20 formed by stacking the unit cells 18 is housed in a casing 29 including the end plates 26a, 26b.

Figure 3:
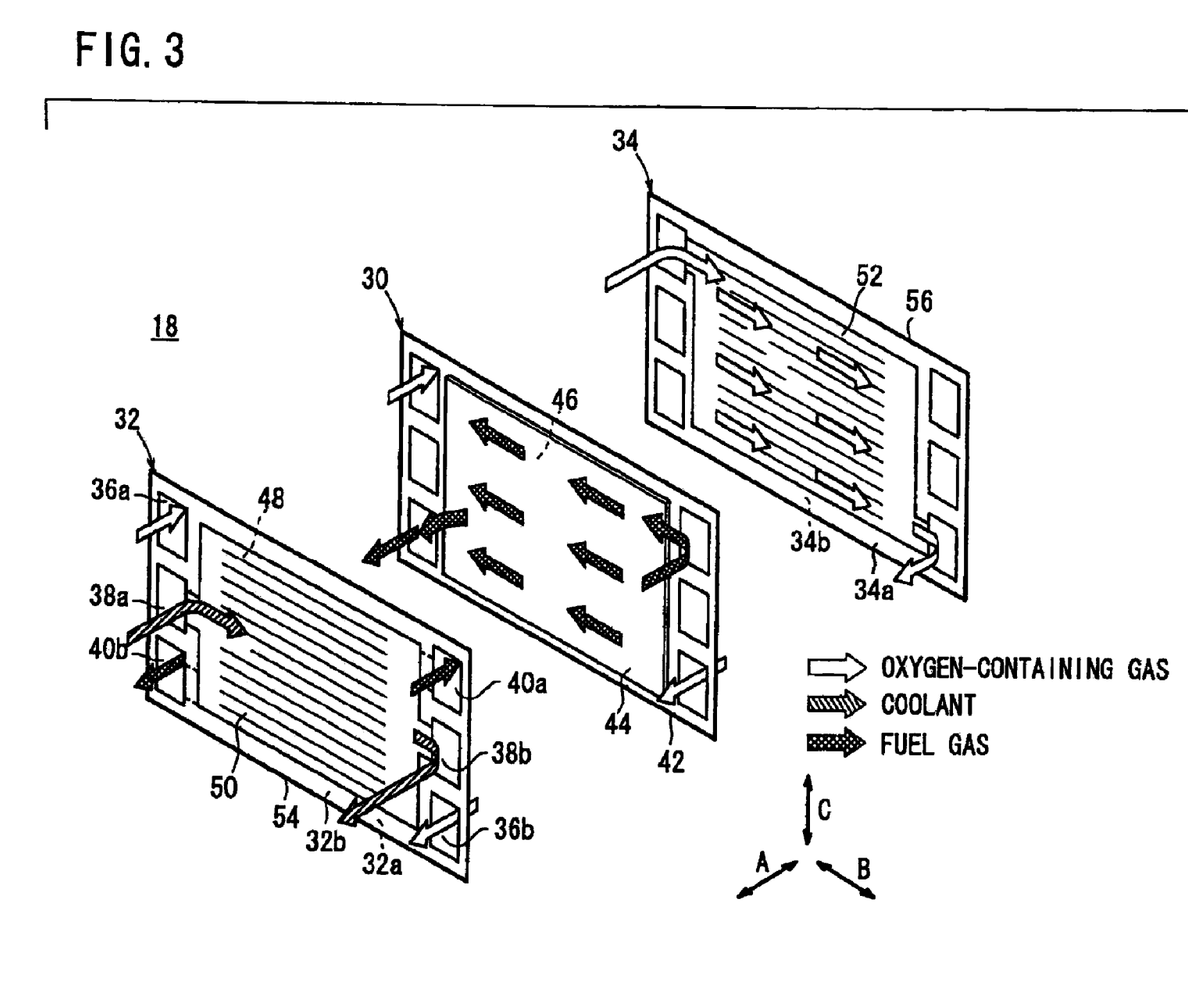
FIG. 3 is an exploded perspective view showing a unit cell of the fuel cell stack.

As shown in FIGS. 2 and 3, each of the unit cells 18 includes a membrane electrode assembly (electrolyte electrode assembly) 30 and first and second metal separators 32, 34 sandwiching the membrane electrode assembly 30. The first and second metal separators 32, 34 are thin corrugated plates.

At one end of the unit cell 18 in a longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are provided. The oxygen-containing gas supply passage 36a, the coolant supply passage 38a, and the fuel gas discharge passage 40b extend through the unit cell 18 in the direction indicated by the arrow A.

At the other end of the unit cell 18 in the longitudinal direction, a fuel gas supply passage 40a for supplying the fuel gas, a coolant discharge passage 38b for discharging the coolant, and an oxygen-containing gas discharge passage 36b for discharging the oxygen-containing gas are provided. The fuel gas supply passage 40a, the coolant discharge passage 38b, and the oxygen-containing gas discharge passage 36b extend through the unit cell 18 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30. The fuel gas flow field 48 is connected to the fuel gas supply passage 40a at one end, and connected to the fuel gas discharge passage 40b at the other end. The fuel gas flow field 48 includes a plurality of grooves extending in the direction indicated by the arrow B, for example. Further, the first metal separator 32 has a coolant flow field 50 on the other surface 32b. The coolant flow field 50 is connected to the coolant supply passage 38a at one end, and connected to the coolant discharge passage 38b at the other end. The coolant flow field 50 includes a plurality of grooves extending in the direction indicated by the arrow B.

The second metal separator 34 has an oxygen-containing gas flow field 52 on its surface 34a facing the membrane electrode assembly 30. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. The other surface 34b of the second metal separator 34 is stacked on the surface 32b of the first metal separator 32. When the first metal separator 32 and the second metal separator 34 are stacked together, the coolant flow field 50 is formed between the surface 32b of the first metal separator 32 and the surface 34b of the second metal separator 34.

A first seal member 54 is formed integrally on the surfaces 32a, 32b of the first metal separator 32 to cover (sandwich) the outer edge of the first metal separator 32. The first seal member 54 is provided around the fuel gas supply passage 40a, the fuel gas discharge passage 40b, and the fuel gas flow field 48 on the surface 32a of the first metal separator 32. The first seal member 54 is not provided between the fuel gas supply passage 40a and the fuel gas flow field 48, and between the fuel gas discharge passage 40b and the fuel gas flow field 48. Thus, the fuel gas supply passage 40a and the fuel gas discharge passage 40b are connected to the fuel gas flow field 48.

A second seal member 56 is formed integrally on the surfaces 34a, 34b of the second metal separator 34 to cover (sandwich) the outer edge of the second metal separator 34. The second seal member 56 is provided around the oxygen-containing gas supply passage 36a, the oxygen-containing gas discharge passage 36b, and the oxygen-containing gas flow field 52 on the surface 34a of the second metal separator 34. The second seal member 56 is not provided between the oxygen-containing gas supply passage 36a and the oxygen-containing gas flow field 52, and between the oxygen-containing gas discharge passage 36b and the oxygen-containing gas flow field 52. Thus, the oxygen-containing gas supply passage 36a and the oxygen-containing gas discharge passage 36b are connected to the oxygen-containing gas flow field 52.

The first seal member 54 is provided around the coolant supply passage 38a, the coolant discharge passage 38b, and the coolant flow field 50 on the surface 32b of the first metal separator 32. The second seal member 56 is provided around the coolant supply passage 38a, the coolant discharge passage 38b, and the coolant flow field 50 on the surface 34b of the second metal separator 32. The first seal member 54 and the second seal member 56 are not provided between the coolant supply passage 38a and the coolant flow field 50, and between the coolant discharge passage 38b and the coolant flow field 50. Thus, the coolant supply passage 38a and the coolant discharge passage 38b are connected to the coolant gas flow field 50.

As shown in FIG. 2, a seal 57 is interposed between the first and second seal members 54, 56 so that the outer edge of the solid polymer electrolyte membrane 42 does not directly contact the casing 29. A small clearance may be formed between the outer edges of the first and second seal members 54, 56, and an inner surface of the casing 29. Alternatively, the outer edges of the first and second seal members 54, 56 may be in contact with the inner surface of the casing 29. In the structure, the first and second metal separators 32, 34 are not deformed excessively beyond a predetermined extent. As shown in FIGS. 1 and 2, plate-shaped terminals 58a, 58b extend from the terminal plates 22a, 22b along a surface of the fuel cell stack 12, respectively.

Figure 4:
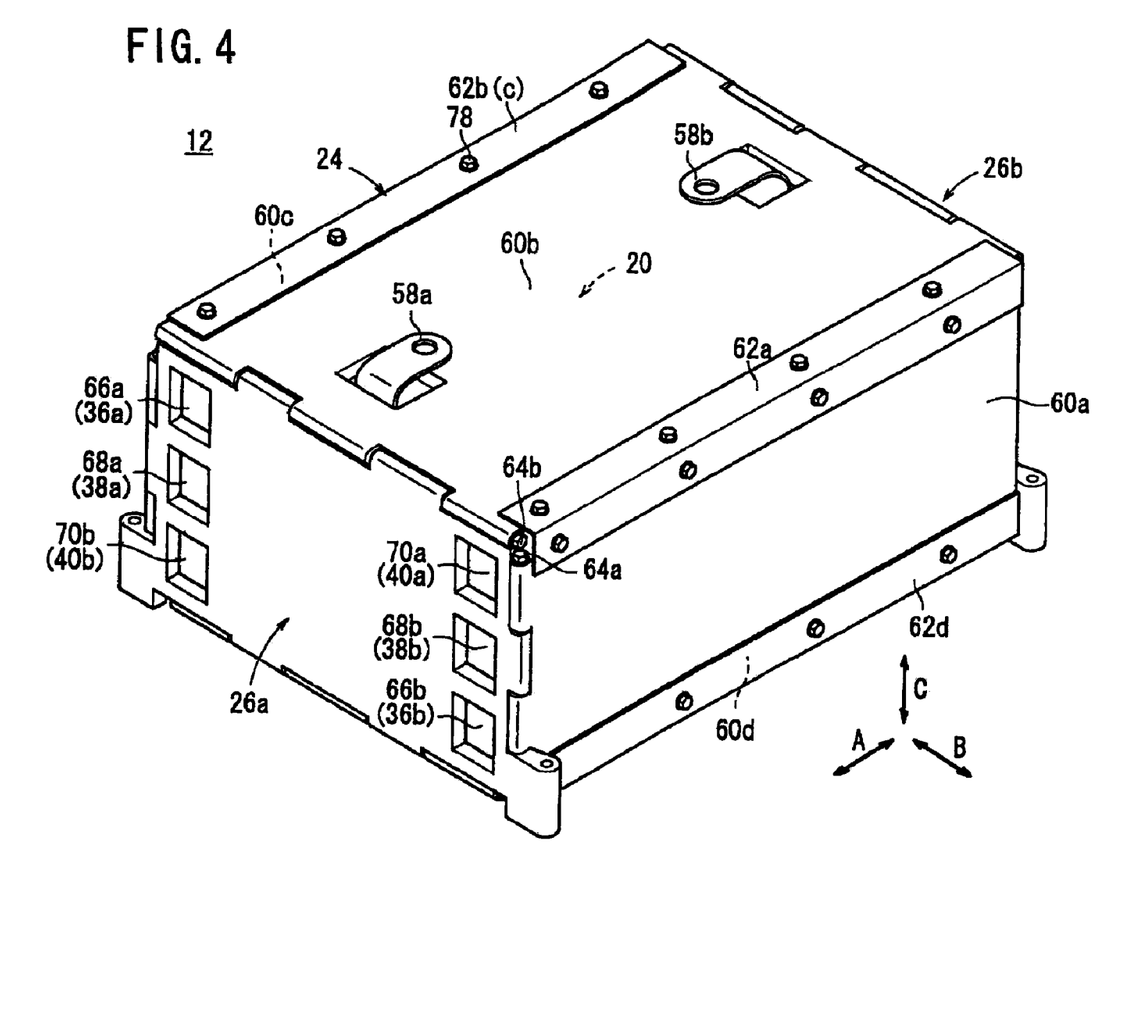
FIG. 4 is a perspective view showing the fuel cell stack.

As shown in FIGS. 2 and 4, the casing 29 includes the end plates 26a, 26b, a plurality of side plates 60a to 60d, angle members (e.g., L angles) 62a to 62d, and coupling pins 64a, 64b. The side plates 60a to 60d are provided on sides of the stack body 20. The angle members 62a to 62d are used as coupling members for coupling adjacent ends of the side plates 60a to 60d. The coupling pins 64a, 64b are used for coupling the end plates 26a, 26b and the side plates 60a to 60d. The length of the coupling pins 64a is short in comparison with the length of the coupling pins 64b.

As shown in FIG. 4, at one end of the first end plate 26a in the direction indicated by an arrow B, an oxygen-containing gas inlet port 66a connected to the oxygen-containing gas supply passage 36a, a coolant inlet port 68a connected to the coolant supply passage 38a, and a fuel gas outlet port 70b connected to the fuel gas discharge passage 40b are provided.

At the other end of the first end plate 26a in the direction indicated by the arrow B, a fuel gas inlet port 70a connected to the fuel gas supply passage 40a, a coolant outlet port 68b connected to the coolant discharge passage 38b, and an oxygen containing gas outlet port 66b connected to the oxygen-containing gas discharge passage 36b are provided.

As shown in FIG. 2, the spacer member 28 has a rectangular shape having predetermined dimensions such that the spacer member 28 is positioned inside the casing 29. The thickness of the spacer member 28 is selected such that the dimensional variation in the stacking direction of the stack body 20 is absorbed, and the desired tightening force is applied to the stack body 20. However, the use of the spacer member 28 is not essential to carry out the present invention. The spacer member 28 may not be used in the case where the dimensional variation in the stacking direction is absorbed by the elasticity of the first and second metal separators 32, 34, for example.

The structure of the second fuel cell stack 14 is substantially the same as the above-described structure of the first fuel cell stack 12. The constituent elements of the second fuel cell stack 14 that are identical to those of the first fuel cell stack 12 are labeled with the same reference numeral, and description thereof will be omitted.

The stack body 20 of the first fuel cell stack 12 and the stack body 20 of the second fuel cell stack 14 have totally the same structure. The polarity of the first fuel cell stack 12 is opposite to the polarity of the second fuel cell stack 14. For example, the stack body 20 of the second fuel cell stack 14 is symmetrical about a point with respect to the stack body 20 of the first fuel cell stack 12. The position of the stack body 20 of the second fuel cell stack 14 is reversed by 180° about a vertical axis from the position of the stack body 20 of the first fuel cell stack 12.

Figure 5:
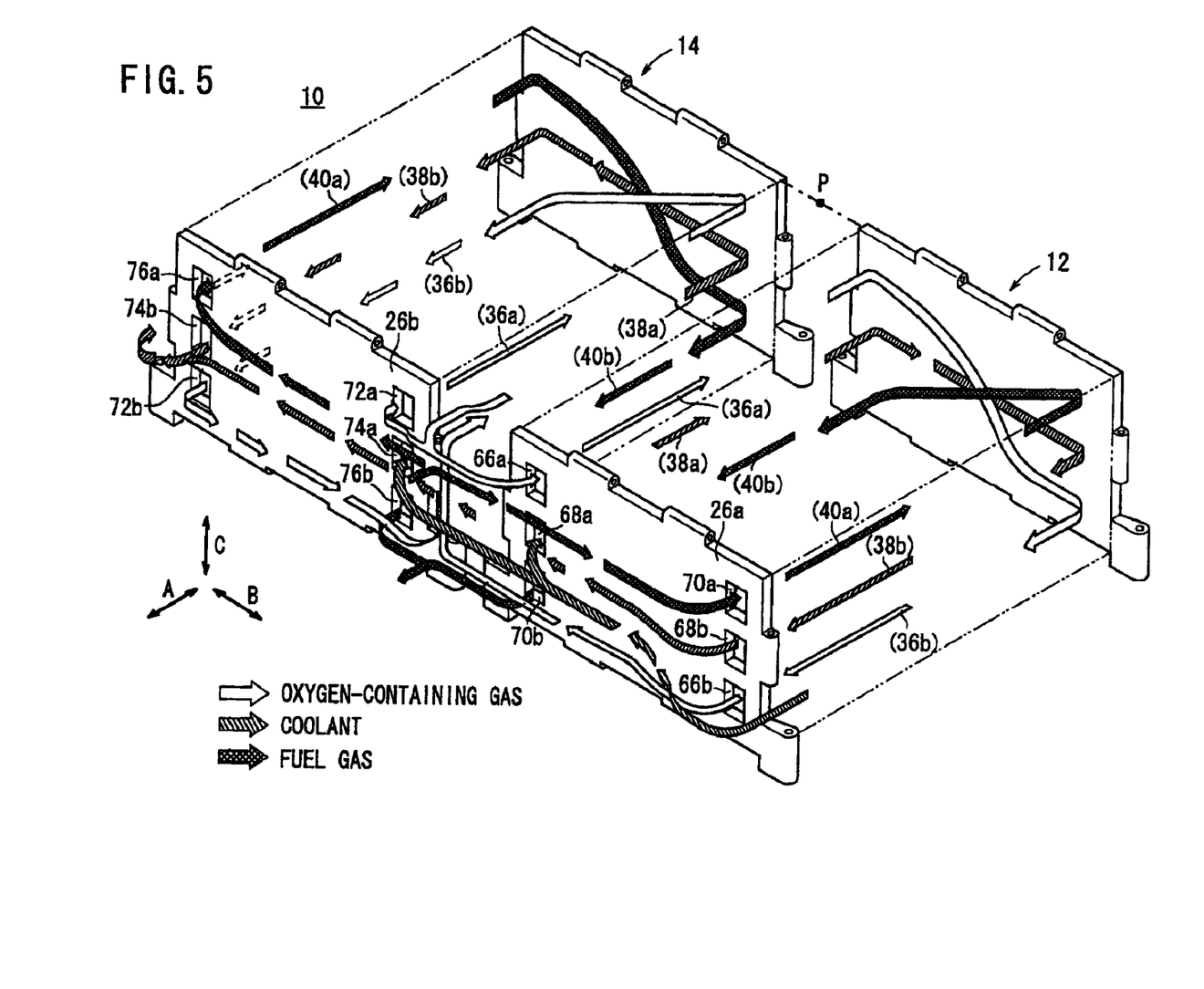
FIG. 5 is a view showing flows of reactant gases and a coolant in the fuel cell system.

As shown in FIG. 5, in the second fuel cell stack 14, the second end plate 26b has an oxygen-containing gas inlet port 72a, a coolant inlet port 74a, and a fuel gas outlet port 76b at one end in the direction indicated by the arrow B, and has a fuel gas inlet port 76a, a coolant outlet port 74b, and an oxygen-containing outlet port 72b at the other end in the direction indicated by the arrow B.

The oxygen-containing gas inlet ports 66a, 72a, the coolant inlet ports 68a, 74a, the fuel gas outlet ports 70b, 76b, the fuel gas inlet ports 70a, 76a, the coolant outlet ports 68b, 74b, and the oxygen-containing gas outlet ports 66b, 72b are provided symmetrically with respect to each other about an intermediate position P between the first fuel cell stack 12 and the second fuel cell stack 14. The oxygen-containing gas inlet ports 66a, 72a are positioned adjacent to each other, the coolant inlet ports 68a, 74a are positioned adjacent to each other, and the fuel gas outlet ports 70b, 76b are positioned adjacent to each other. The fuel gas inlet ports 70a, 76a are positioned remote from each other, the coolant outlet ports 68b, 74a are positioned remote from each other, and the oxygen-containing gas outlet ports 66b, 72b are positioned remote from each other.

Figure 6:
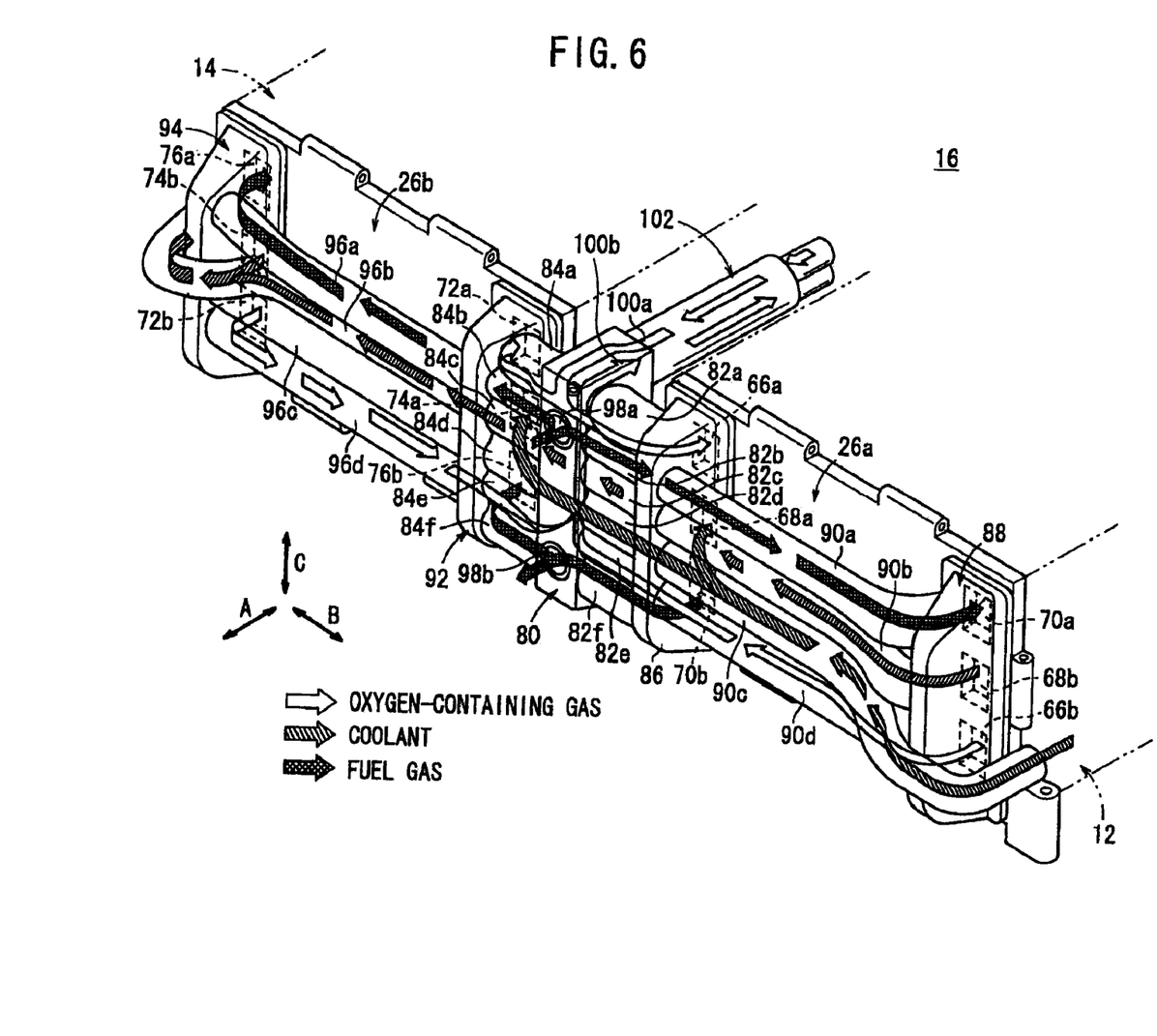
FIG. 6 is a view showing flows of the reactant gases and the coolant in an assembly manifold of the fuel cell system.

As shown in FIG. 1, the assembly manifold 16 is attached to the first and second end plates 26a, 26b which are positioned adjacent to each other at one end of the first and second fuel cell stacks 12, 14. As shown in FIGS. 1 and 6, a connection block 80 is provided at a central position of the assembly manifold 16. Six pipes 82a through 82f are connected to one side of the connection block 80, and six pipes 84a through 84f are connected to the other side of the connection block 80.

The pipes 82a through 82f extend toward the side of the first fuel cell stack 12, and are connected to a first manifold 86. The first manifold 86 is an single manifold connected to the oxygen-containing gas inlet port 66a, the coolant inlet port 68a, and the fuel gas outlet port 70b as holes of three fluid passages formed at one end (left end) of the first fuel cell stack 12.

The fuel gas inlet port 70a, the coolant outlet port 68b, and the oxygen-containing gas outlet port 66b as holes of three fluid passages formed at the other end (right end) of the first fuel cell stack 12 are connected to a single second manifold 88. The first manifold 86 is connected to ends of the four pipes 90a through 90d. The pipes 90a through 90d are in fluid communication with the pipes 82b through 82e, respectively.

The other ends of the pipes 90a, 90b, and 90d are connected to the second manifold 88. The other end of the pipe 90c extends around the second manifold 88, along the side of the first fuel cell stack 12. The outer circumferential surfaces of the pipes 90a through 90d are in contact with each other, and in contact with the surface of the first end plate 26a of the first fuel cell stack 12.

The pipes 84a through 84f extend toward the second fuel cell stack 14, and are connected to a third manifold 92. The third manifold 92 is an single manifold connected to the oxygen-containing gas inlet port 72a, the coolant inlet port 74a, and the fuel gas outlet port 76b as holes of three fluid passages formed at one end (right end) of the second fuel cell stack 14.

The fuel gas inlet port 76a, the coolant outlet port 74b, and the oxygen-containing gas outlet port 72b as holes of three fluid passages formed at the other end (left end) of the second fuel cell stack 14 are connected to a single fourth manifold 94.

The third manifold 92 is connected to ends of the four pipes 96a through 96d. The pipes 96a through 96d are in fluid communication with the pipes 84b through 84e, respectively. The other ends of the pipes 96a, 96c, and 96d are connected to the fourth manifold 94. The other end of the pipe 96b is partially connected to the fourth manifold 94, and extends along the side of the second fuel cell stack 14.

A fuel gas supply port 98a and a fuel gas discharge port 98b are formed on one surface (front surface) 80a of the connection block 80. The fuel gas supply port 98a is connected to the pipes 82b, 84b, and the fuel gas discharge port 98b is connected to the pipes 82f, 84f.

Figure 7:
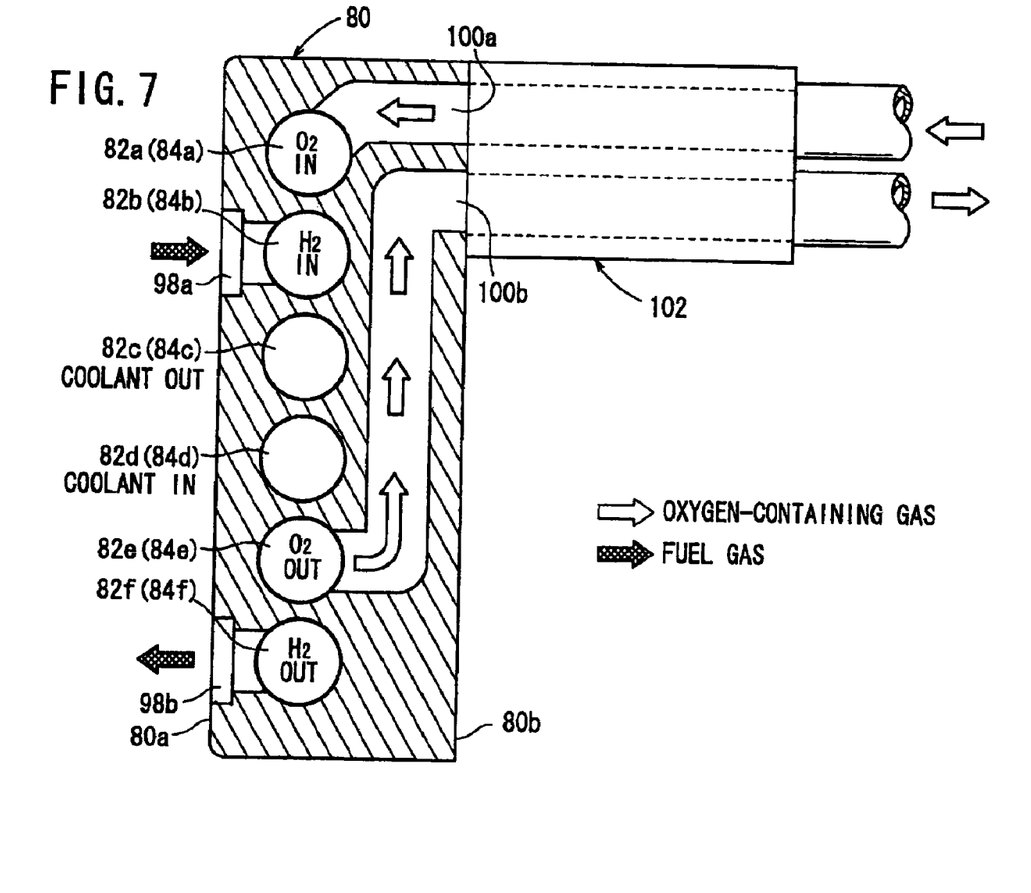
FIG. 7 is a cross sectional view showing a connection block of the assembly manifold.

As shown in FIG. 7, an oxygen-containing gas supply port 100a and an oxygen-containing gas discharge port 100b are formed adjacent to each other at an upper position of the opposite surface (back surface) 80b of the connection block 80. The oxygen-containing gas supply port 100a is connected to the pipes 82a, 84b, and the oxygen-containing gas discharge port 100b is connected to the pipes 82e, 84e. A humidifier 102 is attached to the back surface 80b. The humidifier 102 is connected to the oxygen-containing gas supply port 100a and the oxygen-containing gas discharge port 100b.

Figure 8:
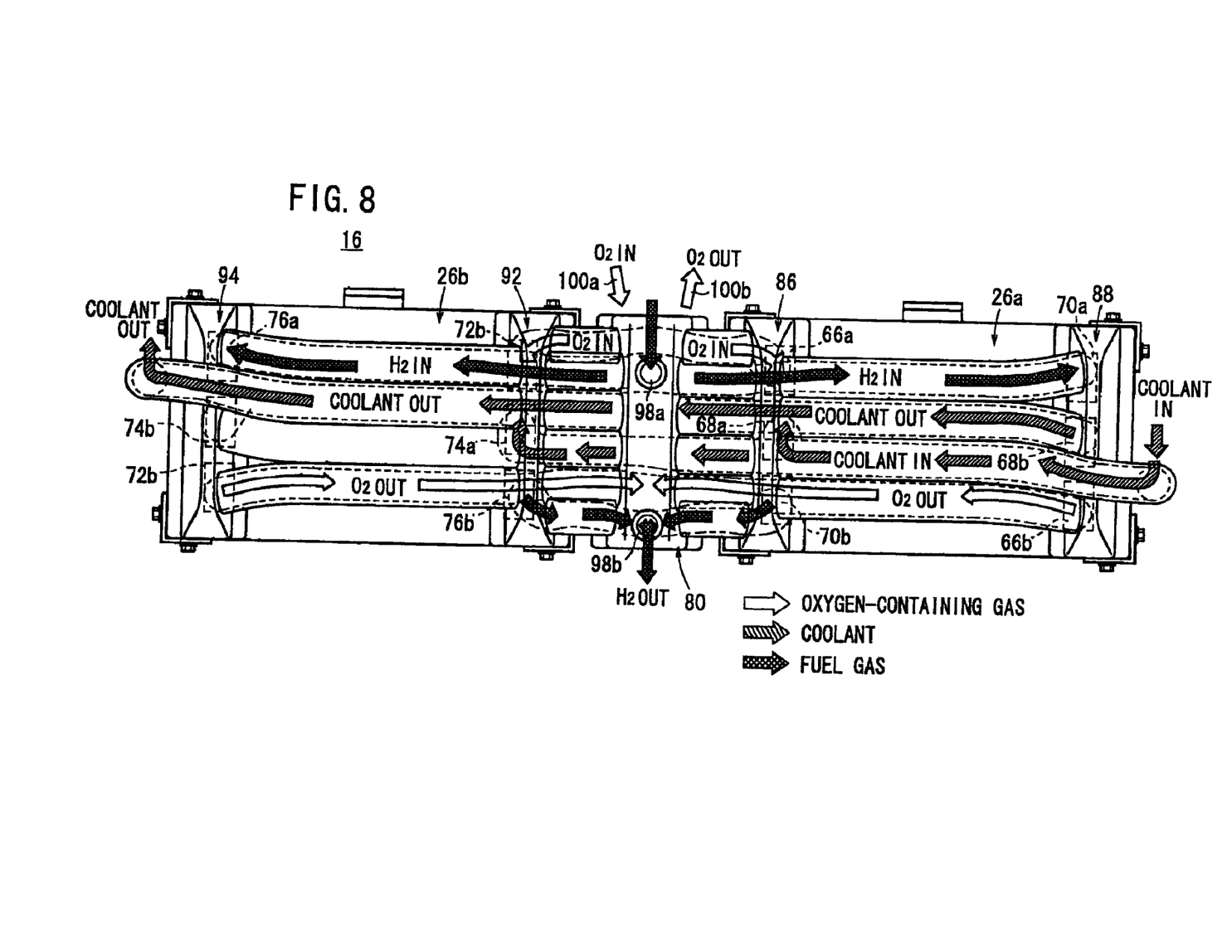
FIG. 8 is a front view showing the assembly manifold.

As shown in FIGS. 6 and 8, in the first manifold 86, the oxygen-containing gas inlet port 66a is connected to the pipe 82a, the coolant inlet port 68b is connected to the pipes 82d, 90c, and the fuel gas outlet port 70b is connected to the pipe 82f. In the second manifold 88, the fuel gas inlet port 70a is connected to the pipe 90a, the coolant inlet port 68b is connected to the pipe 90b, and the oxygen-containing gas outlet port 66b is connected to the pipe 90d.

Likewise, in the third manifold 92, the oxygen-containing gas inlet port 72a is connected to the pipe 84a, the coolant inlet port 74a is connected to the pipe 84d, and the fuel gas discharge port 76b is connected to the pipe 84f. The coolant inlet port 74a is connected to the pipe 96c as necessary. The pipe 96c has a closed end. In the fourth manifold 94, the fuel gas inlet port 76a is connected to the pipe 96a, the coolant outlet port 74b is connected to the pipe 96b, and the oxygen-containing gas outlet port 72b is connected to the pipe 96d.

In the assembly manifold 16, the pipes 82a, 84a function as supply pipes for the oxygen-containing gas, the pipes 82b, 84b, 90a, and 96a function as supply pipes for the fuel gas, the pipes 82c, 84c, 90b, 96b function as discharge pipes for the coolant, the pipes 82d, 84d, 90c function as the supply pipes for the coolant, the pipes 82e, 84e, 90d, 96d function as discharge pipes for the oxygen-containing gas, and the pipes 82f, 84f function as discharge pipes for the fuel gas.

For example, the pipes 82a through 82f, 84a through 84f, 90a through 90d, and 96a through 96d are made of metal material having high thermal conductivity, thermally conductive resin material, or insulating resin material or the like. Insulating coating may be applied to the flow field made of metal material.

As shown in FIG. 1, the terminal 58a of the first fuel cell stack 12 adjacent to the assembly manifold 16 and the terminal 58b of the second fuel cell stack 14 adjacent to the assembly manifold 16 are connected electrically by a cable 104. For example, the terminal 58a has negative polarity, and the terminal 58b has positive polarity. The terminal 58a and the terminal 58b are connected electrically by the cable 104 for connecting the first and second fuel cell stacks 12, 14 serially. The terminal 58b of the first fuel cell stack 12 and the terminal 58a of the second fuel cell stack 14 are connected to an external load 106 such as a motor.

Next, operation of the fuel cell system 10 will be described below.

Firstly, as shown in FIGS. 1, 6 and 7, an oxygen-containing gas is supplied from the humidifier 102 attached to the assembly manifold 16 to the oxygen-containing gas supply port 100a of the connection block 80, and a fuel gas such as a hydrogen-containing gas is supplied to the fuel gas supply port 98a of the connection block 80. Further, a coolant such as pure water, an ethylene glycol or an oil is supplied to the pipe 90c.

The oxygen-containing gas supplied to the oxygen-containing gas supply port 100a of the connection block 80 flows through the pipes 82a, 84a to the first and third manifolds 86, 92. Thus, the oxygen-containing gas is supplied to the oxygen-containing gas inlet ports 66a, 72a of the first and second end plates 26a, 26b of the first and second fuel cell stacks 12, 14 (see FIGS. 5 and 6).

The fuel gas supplied to the fuel gas supply port 98a of the connection block 80 flows through the pipes 82b, 84b, and the pipes 90a, 96a to the fuel gas inlet ports 70a, 76a of the first and second fuel cell stacks 12, 14.

Some of the coolant supplied to the pipe 90c flows from the second manifold 88 to the coolant inlet port 68a of the first fuel cell stack 12, and the remaining coolant flows through the pipes 82d, 84d, and are supplied from the third manifold 92 to the coolant inlet port 74a of the second fuel cell stack 14.

Then, in the first fuel cell stack 12, as shown in FIG. 3, the oxygen-containing gas flows from the oxygen-containing gas supply passage 36a into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40a into the fuel gas flow field 48 of the first metal separator 32 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36b, and is discharged from the oxygen-containing gas outlet port 66b of the first end plate 26a (see FIG. 5). Likewise, after the fuel gas is consumed at the anode 44, the fuel gas flows into the fuel gas discharge passage 40b, and is discharged from the fuel gas outlet port 70b of the first end plate 26a.

The coolant flows from the coolant flow passage 38a into the coolant flow field 50 between the first and second metal separators 32, 34, and flows in the direction indicated by the arrow B. After the coolant is used for cooling the membrane electrode assembly 30, the coolant flows into the coolant discharge passage 38b, and is discharged from the coolant outlet port 68b of the first end plate 26a.

In the second fuel cell stack 14, in the same manner as the case of the first fuel cell stack 12, the consumed oxygen-containing gas is discharged from the oxygen-containing gas outlet port 72b of the second end plate 26b (see FIG. 5). Further, the consumed fuel gas is discharged from the fuel gas outlet port 76b of the second end plate 26b. After the coolant is used for cooling the membrane electrode assembly 30, the coolant is discharged from the coolant outlet port 74b of the second end plate 26b.

As shown in FIGS. 6 and 8, the oxygen-containing gas discharged from the oxygen-containing gas outlet ports 66b, 72b flows from the second and fourth manifolds 88, 94 to the pipes 90d, 96d, and the pipes 82e, 84e. Further, the oxygen-containing gas moves upwardly in the connection block 80, and flows from the oxygen-containing gas discharge port 100b to the humidifier 102 (see FIG. 7).

At the humidifier 102, heat and moisture are exchanged between the oxygen-containing gas before consumption and the oxygen-containing gas after consumption. Therefore, the oxygen-containing gas before consumption is adjusted at the desired humidity and the desired temperature, and then, supplied to the first and second fuel cell stacks 12, 14.

As shown in FIGS. 6 and 8, the fuel gas discharged from the fuel gas outlet ports 70b, 76d flows from the first and third manifolds 86, 92 through the pipes 82f, 84f to the fuel gas discharge port 98b of the connection block 80.

Further, the coolant discharged from the coolant discharge port 68b flows from the second manifold 88 through the pipe 90b to the first manifold 86. Then, the coolant flows through the pipes 82c, 84c, 96b and is discharged to the outside. Further, the coolant discharged from the coolant outlet port 74b is joined in the middle of the pipe 96b, and then, the coolant is discharged to the outside.

In the embodiment of the present invention, the first and second fuel cell stacks 12, 14 are juxtaposed, and the assembly manifold 16 is attached to the adjacent first and second end plates 26a, 26b of the first and second fuel cell stacks 12, 14. The connection block 80 is provided at the central position of the assembly manifold 16. The connection block 80 has the fuel gas supply port 98a, the fuel gas discharge port 98b, the oxygen-containing gas supply port 100a, and the oxygen-containing gas discharge port 100b.

Thus, the fuel gas and the oxygen-containing gas are equally distributed from the connection block 80 to each of the first and second fuel cell stacks 12, 14. The desired power generation performance is maintained in the first and second fuel cell stacks 12, 14.

Further, the assembly manifold 16 is attached to the adjacent first and second end plates 26a, 26b at one end of the first fuel cell stack 12 and the second fuel cell stack 14. Therefore, the overall size of the fuel cell system 10 is small, and the piping structure and the piping operation are simplified.

The fuel gas supply port 98a and the fuel gas discharge port 98b are provided on the front surface 80a of the connection block 80, and the oxygen-containing gas supply port 100a and the oxygen-containing gas discharge port 100b are provided on the back surface 80b of the connection block 80 (see FIG. 7). Therefore, sufficient space for providing the pipes and joints is available on both surfaces (the front surface 80a and the back surface 80b) of the connection block 80. Thus, the space in the fuel cell system 10 is used efficiently.

The humidifier 102 is provided between the first and second fuel cell stacks 12, 14. Therefore, the piping distance between the humidifier 102 and the connection block 80 is reduced effectively.

In the embodiment of the present invention, as shown in FIG. 6, the first fuel cell stack 12 has the single first manifold 86 connected to the oxygen-containing gas inlet port 66a, the coolant inlet port 68a, and the fuel gas outlet port 70b, and the single second manifold 88 connected to the fuel gas inlet port 70a, the coolant outlet port 68b, and the oxygen-containing gas outlet port 66b. Likewise, the second fuel cell stack 14 has the single third manifold 92 connected to the three fluid passages and the single fourth manifold 94 connected to the three fluid passages. Therefore, the number of components of the fuel cell system 10 is considerably reduced, and the overall assembling operation of the assembly manifold 16 is suitably simplified.

Further, in the first fuel cell stack 12, a plurality of the pipes 90a through 90d are provided in contact with the surface of the first end plate 26a. The coolant and the oxygen-containing gas discharged from the first fuel cell stack 12 have high temperature due to power generation in the first fuel cell stack 12. When the coolant and the oxygen-containing gas flow through the pipes 90b, 90d, the heat is transferred from the pipes 90b, 90d to the first end plate 26a.

Therefore, in particular, when operation of the first fuel cell stack 12 is started at a low temperature, it is possible to rapidly warm up the end cell (unit cell provided at the end in the stacking direction) of the first fuel cell stack 12. With the simple structure, it is possible to warm up the first fuel cell stack 12 efficiently.

Further, the adjacent pipes of the pipes 90a through 90d are in contact with each other. The coolant and the oxygen-containing gas discharged from the first fuel cell stack 12 have high temperature. The hot coolant and the oxygen-containing gas flowing through the pipes 90b, 90d are used for heating the coolant and the oxygen-containing gas flowing through the pipes 90a, 90c toward the first fuel cell stack 12.

Therefore, the temperature in the first fuel cell stack 12 is uniform, and the power generation is carried out efficiently. In the second fuel cell stack 14, the some advantages as with the first fuel cell stack 12 can be obtained.

In the embodiment of the present invention, the angle members 62a to 62d are used as the coupling members for example. However, it is not essential to use the angle members 62a to 62d. For example, the side plates 60a to 60d may have flanges which can be bent such that the flanges can be fixed by screws to couple the side plates 60a to 60d with each other. Alternatively, the side plates 60a to 60d may be combined together by welding to function as the coupling members.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising a fuel cell stack, wherein said fuel cell stack comprises a pair of end plates and a plurality of unit cells stacked in a horizontal direction, the plurality of unit cells being interposed between the end plates;

each of said unit cells includes an electrolyte electrode assembly and separators sandwiching said electrolyte electrode assembly, and said electrolyte electrode assembly comprises a pair of electrodes and an electrolyte interposed between said electrodes;

three of six fluid passages comprising a fuel gas supply passage, an oxygen-containing gas supply passage, a coolant supply passage, a fuel gas discharge passage, an oxygen-containing gas discharge passage, and a coolant discharge passage extend through a left end of said fuel cell stack, and the other three of the six fluid passages extend through a right end of said fuel cell stack;

the three fluid passages extending through the left end of said fuel cell stack being aligned along a left side of the end plates, and the three fluid passages extending through the right end of said fuel cell stack being aligned along a right side of the end plates, a single first manifold is connected to said three fluid passages provided at said left end of said fuel cell stack;

a single second manifold is connected to said three fluid passages provided at said right end of said fuel cell stack; and said first and second manifolds are connected by a plurality of pipes.

2. A fuel cell system according to claim 1, wherein said plurality of pipes are in contact with at least one of the end plates.

3. A fuel cell system according to claim 1, wherein adjacent pipes of said plurality of pipes are in contact with each other.

* * * * *